(12) United States Patent
Utsumi et al.

(10) Patent No.: US 6,999,947 B2
(45) Date of Patent: Feb. 14, 2006

(54) LICENSE DEVOLUTION APPARATUS

(75) Inventors: Kenichi Utsumi, Kawasaki (JP); Hideyuki Hirano, Kawasaki (JP); Seigo Kotani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/187,749

(22) Filed: Nov. 9, 1998

(65) Prior Publication Data
US 2001/0032088 A1 Oct. 18, 2001

(30) Foreign Application Priority Data
May 20, 1998 (JP) .................................. 10-138663

(51) Int. Cl.
*H04L 4/00* (2006.01)
*G06F 17/60* (2006.01)

(52) U.S. Cl. ...................... 705/59; 705/56; 705/51; 705/57; 380/4; 380/23; 380/46; 380/59; 713/202; 713/182; 713/189

(58) Field of Classification Search ................ 705/54, 705/56, 58, 59, 51, 57; 713/189, 190, 200
See application file for complete search history.

(56) References Cited

U.S. PATENT DOCUMENTS

| 4,558,176 | A | * | 12/1985 | Arnold et al. ............... 713/190 |
| 5,034,980 | A | * | 7/1991 | Kubota ........................ 713/189 |
| 5,138,712 | A | * | 8/1992 | Corbin ........................ 713/200 |
| 5,182,770 | A | * | 1/1993 | Medveczky et al. .......... 705/56 |
| 5,222,134 | A | * | 6/1993 | Waite et al. .................. 705/59 |
| 5,392,351 | A | * | 2/1995 | Hasebe et al. ................ 705/51 |
| 5,418,852 | A | * | 5/1995 | Itami et al. ................... 705/57 |
| 5,509,070 | A | * | 4/1996 | Schull .......................... 705/54 |
| 5,553,139 | A | * | 9/1996 | Ross et al. ................... 705/59 |
| 5,563,946 | A | * | 10/1996 | Cooper et al. ............... 705/56 |
| 5,638,494 | A | * | 6/1997 | Pinard et al. ............... 709/202 |
| 5,646,999 | A | * | 7/1997 | Saito ........................... 705/54 |

(Continued)

FOREIGN PATENT DOCUMENTS

GB 0613073 B1 * 8/1994

(Continued)

OTHER PUBLICATIONS

How Computers Work by Ron White, Sixth addition, pp. 12-13.*

(Continued)

*Primary Examiner*—James P. Trammell
*Assistant Examiner*—Daniel L. Grenne
(74) *Attorney, Agent, or Firm*—Staas & Halsey LLP

(57) ABSTRACT

There is provided a license devolution system for devolving the right of using as to contents. The license devolution system makes it possible to copy or distribute contents while contributing to a protection of the copyright for the contents. Contents is encrypted with a first key. The first key and use information are encrypted with a second key consisting of a media ID for identifying a first storage medium in which the first key and the use information are stored. In order to devolve the right of using as to the contents, the contents is transferred to a second storage medium of a destination of devolution in the form of encryption. The first key and the use information are decoded with the media ID of the first storage medium, and further encrypted with the media ID of the second storage medium of the destination of devolution into storage in the second storage medium of the destination of devolution.

10 Claims, 7 Drawing Sheets

U.S. PATENT DOCUMENTS

| | | | | |
|---|---|---|---|---|
| 5,668,945 A | * | 9/1997 | Ohba et al. | 713/200 |
| 5,715,403 A | * | 2/1998 | Stefik | 705/44 |
| 5,765,152 A | * | 6/1998 | Erickson | 707/9 |
| 5,845,281 A | * | 12/1998 | Benson et al. | 707/9 |
| 5,848,158 A | * | 12/1998 | Saito et al. | 705/54 |
| 5,857,021 A | * | 1/1999 | Kataoka et al. | 705/54 |
| 5,903,650 A | * | 5/1999 | Ross et al. | 705/59 |
| 6,226,618 B1 | * | 5/2001 | Downs et al. | 705/1 |

FOREIGN PATENT DOCUMENTS

JP 9-134300 5/1997

OTHER PUBLICATIONS

Computer Retail Week, vol.: 4, No.: 83, p.: 55+, Dec. 5, 1994- "We have a unique distribution model" (CD-Direct is a CD-ROM encryption company with proprietary technology and processing).*

News REIwase (for further information apply to company indexed), Jul. 18, 1984, p.: 1,21- New invention safegaurds computer data. Gale Group PROMT -2005 Gale Group. Dialog File No. 160 Acession No. 1063366.*

* cited by examiner

LICENSE DEVOLUTION APPARATUS

BACKGROUND OF THE INVENTION

1. Field of the Invention

The present invention relates to a license devolution apparatus for devolving the right to use contents from the first storage medium to the second storage medium.

2. Description of the Related Art

Recently, it has become a subject of discussion how the copyright is effectively protected.

In case of tangible objects, for example, books, it is relatively easy to protect the copyright for such tangible objects, since distributing books involves no copy per se, and when a book is resold, the book is passed to the buyer, so that the seller does not have the book. However, in case of writings placed in a form of digital information, it is very difficult to effectively protect the copyright for such writings, since for example, when the writings placed in a form of digital information are transmitted via a network, the same writings are obtained on both the transmittal end and the receiver end, and thus the distribution involves a copy per se.

SUMMARY OF THE INVENTION

In view of the foregoing, it is therefore an object of the present invention to provide a license devolution apparatus capable of devolving the right to use contents such as a document a picture and a program, which are digitized, while contributing to a protection of the copyright for the contents.

To attain the above-mentioned object, in the present invention, there is provided a license devolution apparatus wherein a first storage medium for storing therein contents encrypted with a predetermined key, a first media ID for identifying one's own self, and a first encryption secure information on which the key and a first use information representative of a right of using as to the contents are encrypted together with one another or individually with the first media ID, and a second storage medium for storing therein a second media ID for identifying one's own self are accessed so that the right of using as to the contents stored in said first storage medium is devolved from said first storage medium to said second storage medium, said license devolution apparatus comprising:

decoding means for decoding the first encryption secure information stored in said first storage medium using the first media ID to obtain the key and the first use information; and encryption means for encrypting the key obtained through decoding by said decoding means and a second use information representative of a second right of using in which a first right of using represented by the first use information obtained through decoding by said decoding means is transferred or distributed, together with one another or individually with the second media ID to generate a second encryption secure information into storage in said second storage medium.

In the license devolution apparatus as mentioned above, it is acceptable that said encryption means encrypts a third use information representative of a third right of using obtained through subtracting the second right of using from the first right of using, or both the key and the third right of using with the first media ID, and write encrypted ones into the first storage medium, so that the first storage medium stores therein a third encryption secure information in which both the key and the third use information are encrypted with the first media ID, instead of the first encryption secure information. Further, it is acceptable that in the event that entire rights of using as to the contents, to which the first storage medium is entitled, are devolved to the second storage medium, said encryption means generates the key obtained through decoding by said decoding means and the second use information in which the second use information representative of the second right of using succeeded to the first right of using in its entirety is encrypted, into storage in the second storage means, and destroys the key constituting the first encryption secure information stored in the first storage medium.

Incidentally, the above-mentioned "a first encryption secure information on which the key and a first use information representative of a right of using as to the contents are encrypted together with one another or individually with the first media ID" means that it is acceptable that a key is encrypted with the first media ID, and in addition the first use information is encrypted with a first media information, and then the combination of the encrypted key and the encrypted first use information is called/named/termed or addressed as the first encryption secure information, or alternatively it is acceptable that a series of the key and the first use information is encrypted with the first media ID information, and the encrypted information is addressed as the first encryption secure information.

This is similar to the above-mentioned matter of "encrypting the key obtained through decoding by said decoding means and a second use information representative of a second right of using in which a first right of using represented by the first use information obtained through decoding by said decoding means is transferred or distributed, together with one another or individually with the second media ID to generate a second encryption secure information into storage in said second storage medium" and "a third encryption secure information in which both the key and the third use information are encrypted with the first media ID".

Further, the above-mentioned "encrypts a third use information representative of a third right of using obtained through subtracting the second right of using from the first right of using, or both the key and the third right of using with the first media ID" means that it is sufficient for a system in which the key and the first use information or the second use information are individually encrypted that only the third use information is encrypted, and on the other hand, for a system in which a series of the key and the first (or second) use information is encrypted, a series of the key and third use information is encrypted.

The license devolution apparatus of the present invention has been made taking notice of the point that for example, an MO (magneto-optical disk) and a hard-disk have their inherent ID (referred to as a media ID).

Distribution of contents encrypted by a predetermined key makes it impossible to use the encrypted contents unless it is decoded with the use of the key. Thus, both the key for decoding the encrypted contents and use information (for example, information indicative of whether the use of the contents is permitted) are encrypted with the media ID inherent to the storage medium. In this manner, the encrypted contents is not able to be used even if the contents is distributed per se apart from the storage medium which originally stores therein the contents, and further even if the key is also distributed, the party who received the distribution cannot decode the key because the media ID is different, and thereby preventing unfair use by a person who is not entitled to the right of using.

According to such a system as mentioned above, in order to transfer the right of using one's own (first storage medium) to the destination of devolution (second storage medium), a key and one's own use information are decoded with a media ID of one's own (first storage medium), the right of using is distributed (or in its entirety) within a range (for example, the residual available number of times) of the right of using of one's own, and the key and the use information distributed or in its entirety are encrypted with the media ID (second media ID) of the destination of devolution into storage in the destination of devolution (second storage medium). With respect to one's own self (first storage medium), the remaining right of using (including the right of using such as no right of using) is encrypted with the media ID (first media ID) of one's own (first storage medium) into storage in one's own self (first storage medium). Alternatively, in the event that the right of using is devolved in its entirety, it is acceptable that the key, which is stored in the form of encryption in one's own self (first storage medium), is destroyed instead of encrypting the remaining right of using (in this case, the right of using such as no right of using) into storage in one's own self (first storage medium). This make it possible to transfer the right of using while contributing to a protection of the copyright for the contents.

In the above-mentioned license devolution apparatus according to the present invention, it is preferable that before devolution of the right of using as to contents, the first storage medium stores therein encrypted contents as to which the right of using is intended to be devolved, and that said license devolution apparatus further comprises contents transfer means for reading the encrypted contents of interest in devolution stored in the first storage medium, and storing in the second storage medium the contents thus read in form of an encryption.

Contents itself is distributed in the form of encryption. Accordingly, it is acceptable that the contents is distributed at any time. For example, in the event that the contents is already distributed, it is sufficient that only the key and the right of using are transferred. In this case, it is acceptable that for example, the above-mentioned contents transfer means is provided to transfer (copy) the contents of interest in devolution from the first storage medium to the second storage medium.

Further, in the above-mentioned license devolution apparatus according to the present invention, it is acceptable that the first use information and the second use information are representative of the presence of the right of using, and the third use information is representative of the absence of the right of using. And it is also acceptable that the first use information is representative of a first available number of times or available time, the second use information is representative of a second available number of times or available time which is less than the first available number of times or available time, and the third use information is representative of a third available number of times or available time which is obtained through subtracting the second available number of times or available time from the first available number of times or available time.

It is also acceptable that for example, an ID identifying a person who is entitled to the right of using is selected as use information, and any one is acceptable, as the use information, which is indicative of the presence or absence and range of the right of using.

Furthermore, in the above-mentioned license devolution apparatus according to the present invention, it is preferable that the license devolution apparatus further comprises a first drive and a second drive for driving the first storage medium and the second storage medium, respectively, said first drive and said second drive having a first firmware and a second firmware for accessing the first storage medium and the second storage medium, respectively;

that said decoding means and said encryption means are arranged in a firmware consisting of said first firmware and said second firmware in form of a composite unit; and that only said first firmware has authority to access the first storage medium driven by said first drive, and only said second firmware has authority to access the second storage medium driven by said second drive.

Here, the above-described "only said first firmware has authority to access the first storage medium driven by said first drive" and "only said second firmware has authority to access the second storage medium driven by said second drive" imply that there is provided an arrangement in which it is impossible to access the first storage medium and the second storage medium directly from for example, the application program and the like without interposing the first firmware and the second firmware. Providing such arrangement makes it possible to more reliably protect the copyright for the contents, including the following case.

That is, for example, in case of a system in which it is possible to access storage mediums directly from the application program without interposing firmwares, before the right of using is devolved from the first storage medium to the second storage medium, the first storage medium is directly accessed through the application program to read the above-mentioned first encryption secure information into storage in the third storage medium. In this condition, the right of using is devolved from the first storage medium to the second storage medium. After completion of the devolution, again the first storage medium is directly accessed through the application program to write into the first storage medium the first encryption secure information which is copied beforehand on the third storage medium before devolution. In this case, the first storage medium returns to the state before the right of using is devolved, and the right of using is generated on the second storage medium too. Thus, the copyright cannot be protected.

For this reason, as mentioned above, there is provided an arrangement in which an access is permitted from only the firmwares. This arrangement makes it possible to prevent an unfair use of the right of using, and thereby more reliably protecting the copyright.

DESCRIPTION OF THE PREFERRED EMBODIMENTS

Hereinafter, there will be described embodiments of the present invention.

For the purpose of the better understanding, first, a conceptual embodiment will be described, and then a specific embodiment will be described.

Figure 1:
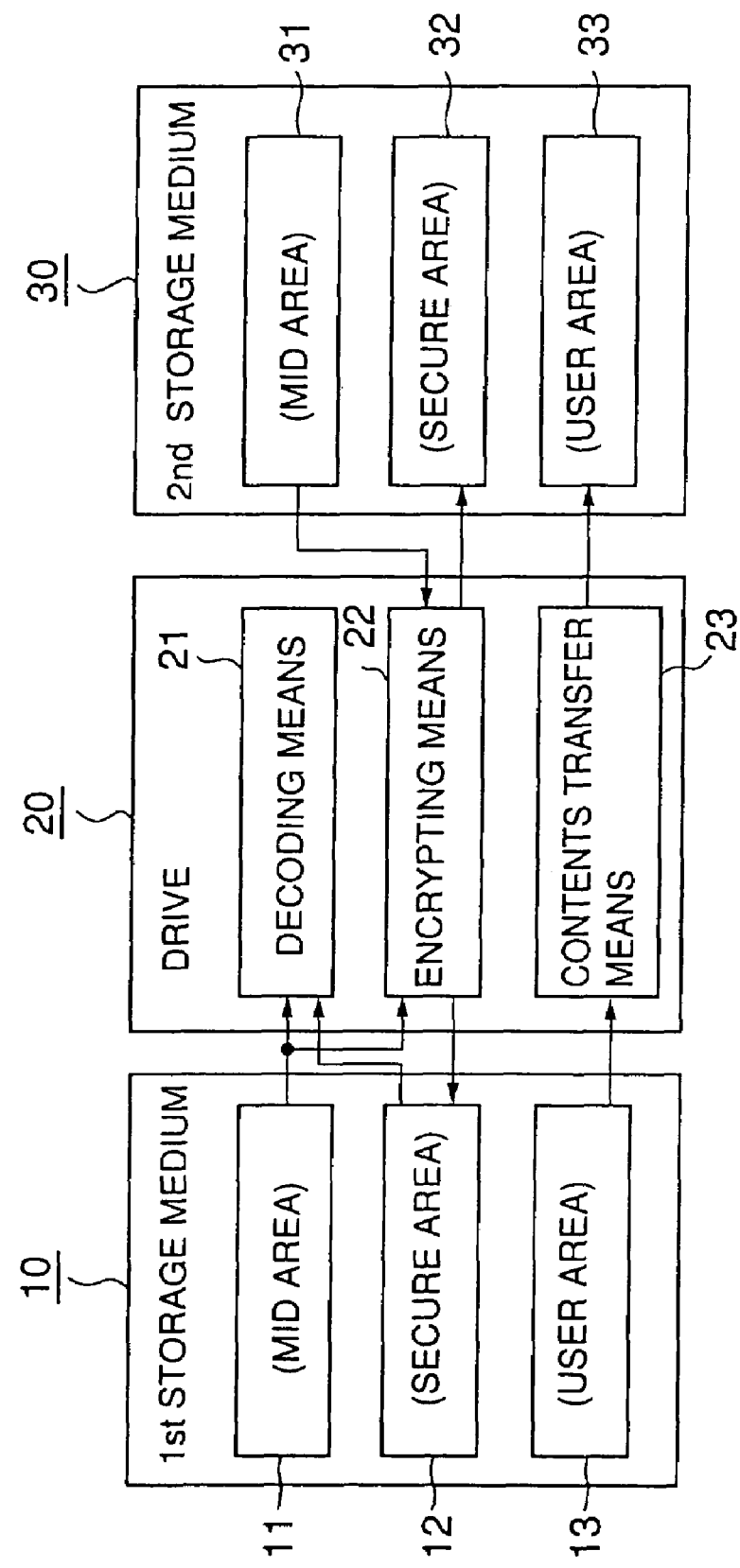
FIG. 1 is a block diagram showing a functional structure of a license devolution apparatus according to an embodiment of the present invention.
Figure 2:
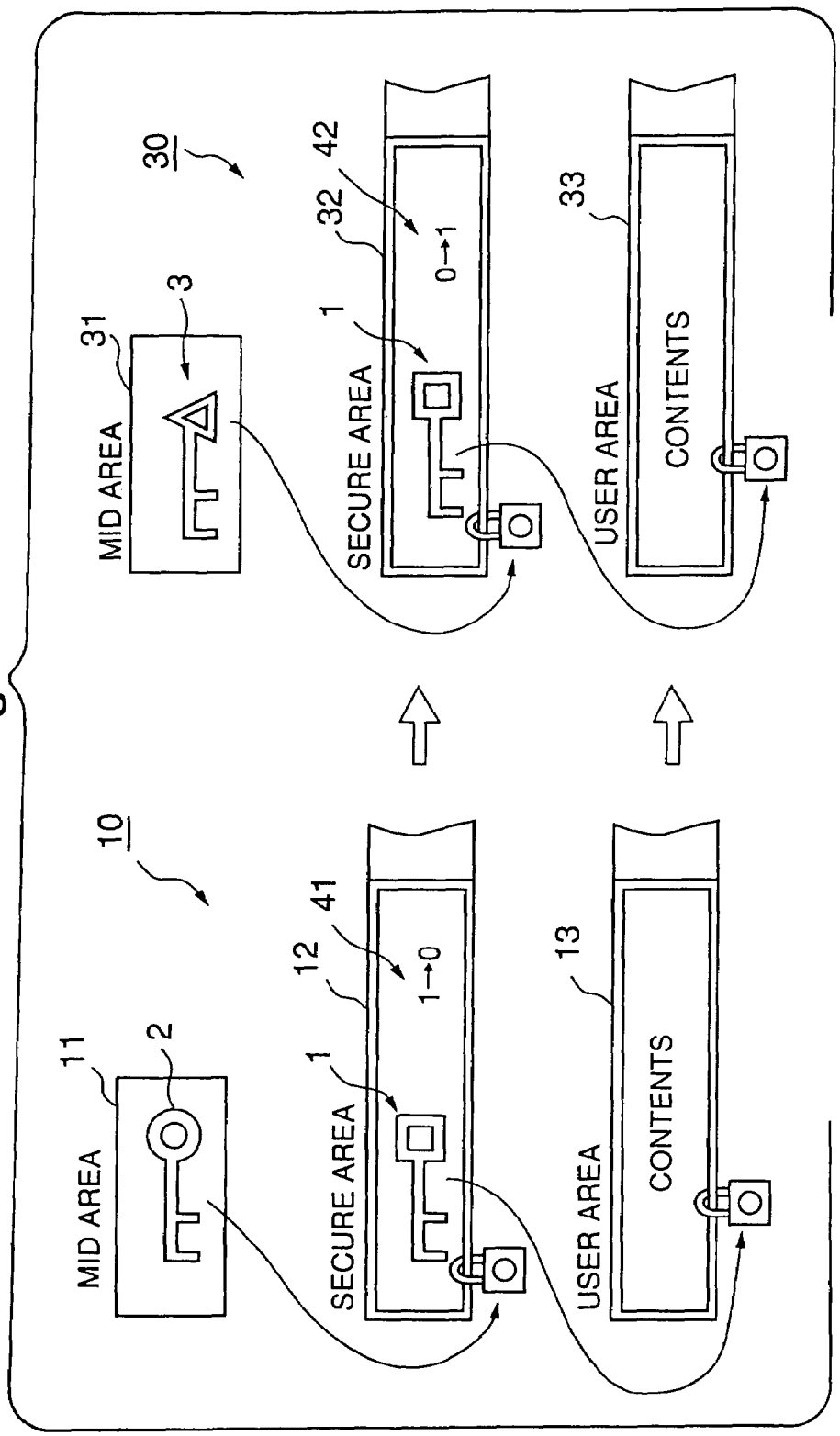
FIG. 2 is a typical illustration useful for understanding the license devolution apparatus shown in FIG. 1.

FIG. 1 is a block diagram showing a functional structure of a license devolution apparatus according to an embodiment of the present invention. FIG. 2 is a typical illustration useful for understanding the license devolution apparatus shown in FIG. 1.

In FIG. 1, there is shown a first storage medium 10, a drive 20, and a second storage medium 30. With respect to the first storage medium 10 and the second storage medium 30, it doesn't matter what type of storage medium is concerned, but it is necessary for each of them to have the media ID for identifying the storage medium. For the media ID, there is no need to surely discriminate the same type of storage medium, and any one is acceptable, as the media ID, which is unique to the storage medium in such an extent that for example, it is almost not possible to expect that two storage mediums each having the same media ID could exist.

According to the present embodiment, the drive 20 is a composite unit of a first drive for driving the first storage medium 10, for example, a magneto-optical disc drive unit in the event that the first storage medium 10 is an MO (magneto-optical disc), and a second drive for driving the second storage medium 30, for example, a hard disc drive unit in the event that the second storage medium 30 is a hard disc.

The first drive is loaded with a first firmware for accessing the first storage medium driven by the first drive, which first firmware comprises a combination of a microcomputer and a software operated by the microcomputer. Likely, the second drive is loaded with a second firmware for accessing the second storage medium driven by the second drive, which second firmware comprises a combination of a microcomputer and a software operated by the microcomputer. Here, the drive 20 is loaded with a firmware in the form of the composite unit of the first firmware and the second firmware.

The first storage medium 10 and the second storage medium 30 have: MID areas 11 and 31 in each of which one's own media ID is stored; secure areas 12 and 32 in each of which information as to the right to use contents and other information as to the attribute of contents are stored; and user areas 13 and 33 in each of which contents are stored per se, respectively. Here, it is presumed that the right to use contents, which the first storage medium 10 is entitled to, is devolved to the second storage medium 30. Consequently, it is assumed that the MID area 11, the secure area 12 and the user area 13 of the first storage medium 10 actually store therein the media ID, information as to the right to use contents and other information as to the attribute of contents, and the contents, respectively.

On the other hand, the MID area 31 of the second storage medium 30 stores therein the media ID of the second storage medium 30. With respect to the secure area 32 and the user area 33 of the second storage medium 30, however, it is either acceptable that those areas are prepared beforehand, or alternatively, those areas are produced when the right to use contents is devolved.

Decoding means 21, encrypting means 22 and contents moving means 23 are constructed in the firmware loaded in the drive 20. An application program can activate the firmware, but cannot control the operation of the firmware, or cannot directly access the first storage medium and the second storage medium without the firmware intervention.

In effect, the MID areas 11 and 31 are concerned with an area in which reading by the firmware is permitted but writing is inhibited. In principle, including a case of the firmware intervention, the application is inhibited to access the MID areas 11 and 31.

The secure areas 12 and 32 and the user areas 13 and 33 are concerned with an area in which read and write by the firmware are permitted. According to the present embodiment, the application is permitted to access the secure areas 12 and 32 and the user areas 13 and 33 only in case of the firmware intervention, but is inhibited from direct read and write. However, with respect to the user areas 13 and 33, it is acceptable that those areas are concerned with an area which is permitted direct access by the application.

With respect to the MID areas 11 and 31, it is preferable that those areas are provided on a non-volatile storage medium, which is not rewritable physically, independent of the secure areas 12 and 32 and the user areas 13 and 33. According to the present embodiment, the MID areas 11 and 31 are provided on the first storage medium 10 and the second storage medium 30, respectively, together with the secure areas 12 and 32 and the user areas 13 and 33.

As shown in FIG. 2, contents stored in the user area 13 of the first storage medium 10 have been stored in form of encryption by a key 1, which has been stored in the secure area 12 together with use information 41 in form of encryption by a key 2 consisting of the media ID of the first storage medium 10, the key 2 being stored in the MID area 11. In FIG. 2, the use information 41 stored in the secure area 12 is denoted by '1→0'. '1' implies the presence of the right to use contents. '0' implies the absence of the right to use contents. '1→0' implies that before the devolution of the right of using, '1' is given, and when the right of using is devolved, '1' is rewritten into '0'. In FIG. 2, the secure area 12 and the user area 13 are depicted in such a manner that they are further extended to the right. This means it happens in some cases that a plurality of blocks of contents are stored in the user area of a single storage medium (here the first storage medium 10), and a key and use information on each of the plurality of blocks of contents are stored in the secure area 12.

In order to encrypt the key 1 and the use information 41 with the key 2, according to FIG. 2, information of the key 1 and the use information 41 in their combination is encrypted by the key 2. Alternatively, it is acceptable that the key 1 is encrypted by the key 2 and in addition the use information 41 is encrypted by the key 2. In any cases, the combination of the key 1 encrypted by the key 2 and the use information encrypted by the key 2 is referred to as encryption secure information (the first encryption secure information referred to in the present invention).

In order to devolve the right to use contents, the decoding means 21 of the drive 20 shown in FIG. 1 is used to decode the first encryption secure information, which is stored in the secure area 12, with the key 2 consisting of the media ID (the first media ID referred to in the present invention) of the first storage medium 10, the media ID being stored in the MID area 11 of the first storage medium 10. Decrypting the information thus decoded makes it possible to derive the key 1 of the plaintext and the use information 41 (here '1' indicative of the presence of the right of using). Next, the encrypting means 22 of the drive 20 shown in FIG. 1 is used to encrypt the key 1 of the plaintext and the use information 41 (here '1' indicative of the presence of the right of using) with a key 3 consisting of the media ID (the second media ID referred to in the present invention) stored in the MID area 31 of the second storage medium 30, so that the second encryption secure information is created and stored in the secure area 32 of the second storage medium 30. The use information 42 depicted in the secure area 32 of the second storage medium 30 in FIG. 2 is expressed by '0→1'. This means that before devolution of the right of using, the right of using is absent, or '0' and when the devolution of the right of using is received, the right of using is present, or '1'.

On the other hand, in the first storage medium 10, the decoded use information 41 is rewritten into '0' indicative of the absence of the right of using, and the decoded key 1 and the use information indicative of the absence of the right of using are encrypted with the key 2 consisting of the media ID of the first storage medium 10 to generate a new encryption secure information (the third encryption secure information referred to in the present invention). The first encryption secure information, which is stored in the secure area 12 of the first storage medium 10, is replaced by the third encryption secure information thus newly generated.

Alternatively, it is acceptable that the key 1, which is stored in form of encryption in the secure area 12 of the first storage medium 10, is destroyed instead of generating third encryption secure information and storing it in the first storage medium 10, since the key 1 is unnecessary because the right to use contents is absent in the first storage medium 10.

The contents encrypted with the key 1, which are stored in the user area 13 of the first storage medium 10, are read out from the first storage medium 10 by the contents moving means 23 of the drive 20 shown in FIG. 1, and are stored in the user area 33 of the second storage medium 30, while the contents are kept on encryption with the key 1.

In this manner, the right to use contents, which the first storage medium 10 was entitled to, is devolved to the second storage medium 30.

Thereafter, when the second drive for driving the second storage medium 30 receives from the application program a request for reading the contents, the second firmware loaded on the second drive accesses the second storage medium 30, so that the encryption secure information, which is stored in the secure area 32, is decoded with the key 3 consisting of the media ID of the second storage medium 30, the key 3 being stored in the MID 31 of the second storage medium 30; it is confirmed that the right of using exists; the encrypted contents, which are stored in the user area 33, are decoded with the key 1; and the decoded contents are transmitted.

On the other hand, after devolution of the right of using, when the first drive for driving the first storage medium 10 receives from the application program a request for reading the contents associated with the devolved right of using, the first firmware loaded on the first drive accesses the first storage medium 10, so that the encryption secure information, which is stored in the secure area 12, is decoded with the key 2 consisting of the media ID of the first storage medium 10, the key 2 being stored in the MID of the first storage medium; it is confirmed that the right of using does not exist, alternatively in case of the above-mentioned system in which the key 1 is destroyed, it is confirmed that the key 1 has been destroyed, or the associated contents cannot decoded, and the application program is informed that the contents cannot be read. In this manner, it is possible to effectively devolve the right to use contents without infringing on the right of the person who is entitled to the right to use the contents.

According to the above-mentioned embodiment, for the purpose of the simplification of the explanation, it is explained that the use information is the binary information of '1' indicative of the presence of the right of using and '0' indicative of the absence of the right of using. It is acceptable, however, that the use information represents the available number of to use the contents times. For example, assuming that the use information for the first storage medium 10 before the devolution is set to '10' indicative of 10 times in the available number of times, it is acceptable that a part of 10 times in the available number of times, for example, 3 times is only devolved to the second storage medium 30. In this case, the use information for the second storage medium 30 offers '3' indicative of 3 times in the available number of times, and '7' indicative of 7 times in the available number of times is rewritten as the use information into the first storage medium 10. Whenever the contents are used in the first storage medium 10 or the second storage medium 30, the available number of times of the first storage medium 10 or the second storage medium 30 is decreased one by one by the firmware loaded on the first drive or the firmware loaded on the second drive.

In the event that all 3 times of use devolved to the second storage medium 30 has been used, if the right of using still remains in the first storage medium 10, it is acceptable that a part or all of the remaining right of using is devolved again to the second storage medium 30 in accordance with the same procedure as mentioned above. In this case, however, the encrypted contents have been already transferred to the second storage medium 30. Consequently, there is no need to transfer the contents to the second storage medium 30, and it is sufficient to transfer only the contents to the second storage medium 30.

According to the embodiment shown in FIG. 2, both the key 1 and the use information are regarded as a piece of information, so that the piece of information is encrypted with the key 2 to generate the encryption secure information for the first storage medium 10; and both the key 1 and the use information are regarded as a piece of information, so that the piece of information is encrypted with the key 3 to generate the encryption secure information for the second storage medium 30. It is acceptable, however, that the key 1 and the use information are individually encrypted. In this case, since the key 1 has been stored in the first storage medium 10 in form of the encryption, it is sufficient for devolution of the right of using that only the new use information is encrypted and rewritten into the first storage medium 10. In the event that the available number of times is devolved on a divisional basis, when devolution on and after the second time is carried out, the key 1 has been already stored in the second storage medium 30 in form of the encryption with the key 3, and thus it is sufficient that only the use information indicative of the available number of times accepted in devolution is encrypted with the key 3 and written into the secure area 32.

Also it is acceptable that not only the key 1 and the use information, but also the attributes other than the use information of contents, for example, names of contents, final access data for contents, etc. In this case, in the event that the attributes are one which don't need to be encrypted, it is acceptable that the attributes are stored in form of the plaintext. Alternatively, even if the attributes are one which don't need to be encrypted, it is acceptable that the attributes are encrypted together with the key 1 and the use information.

Further, according to the above-mentioned embodiment, as the use information, the presence or absence of the right of using, and the available number of times are raised by way of example. However, it is acceptable that as the use information, the available time, ID indicative of a person who is entitled to the access, and various types of information indicative of the presence or absence of the right of using, or the available range, etc. are adopted.

Figure 3:
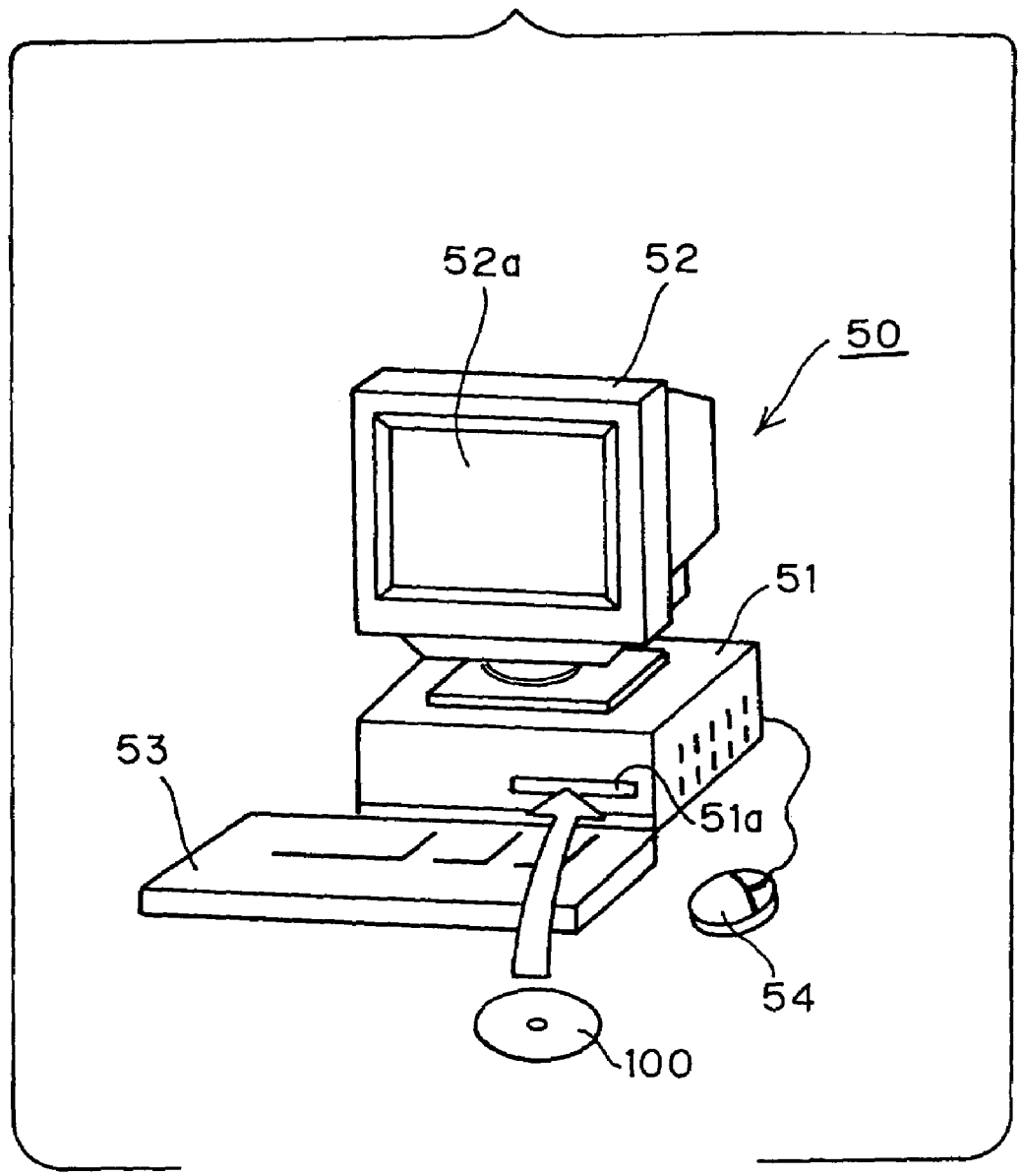
FIG. 3 is a perspective view of a computer system which is loaded with a license devolution apparatus according to an embodiment of the present invention.
Figure 4:
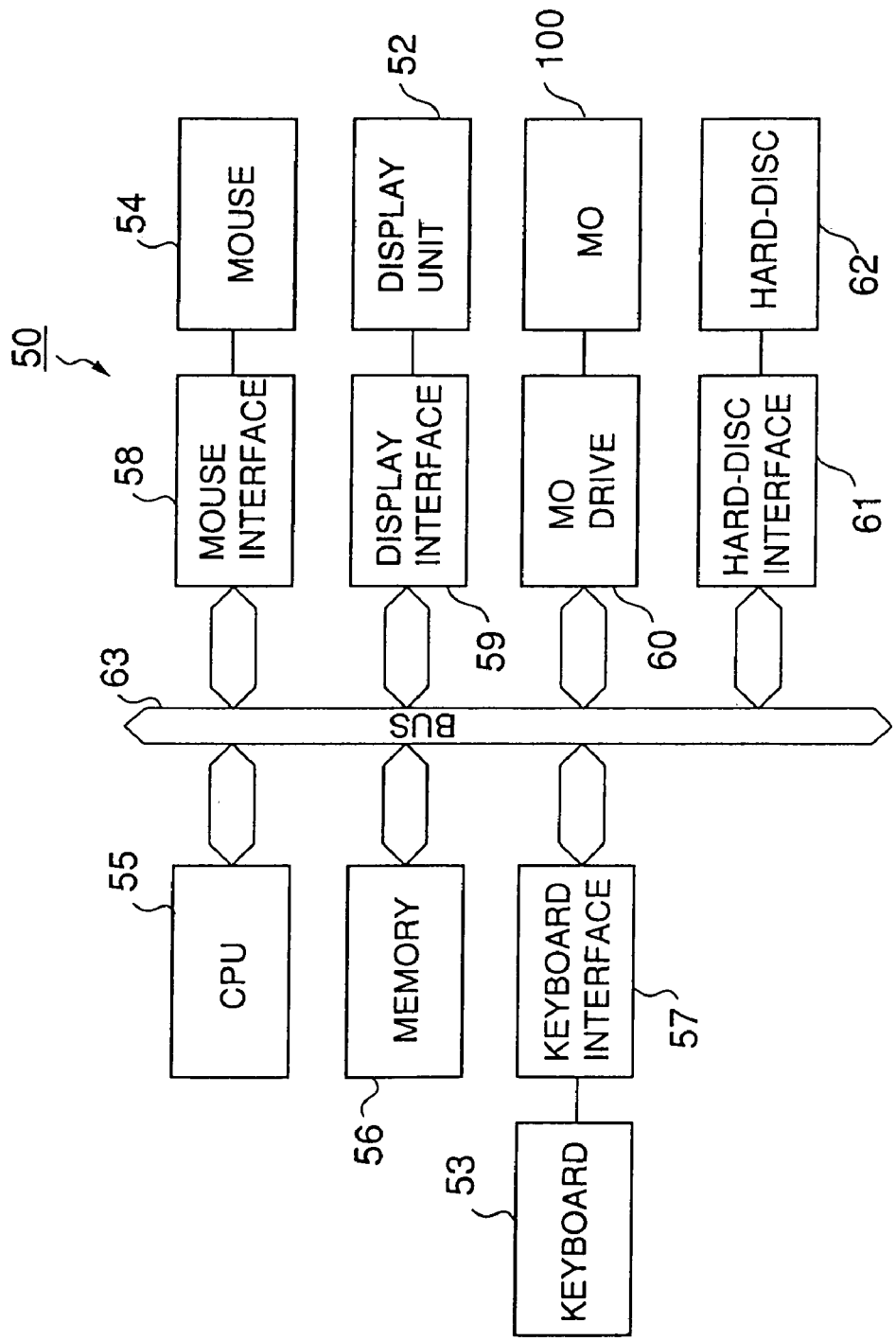
FIG. 4 is a block diagram of a functional structure of the computer system shown in FIG. 3.

FIG. 3 is a perspective view of a computer system which is loaded with a license devolution apparatus according to an embodiment of the present invention. FIG. 4 is a block diagram of a functional structure of the computer system shown in FIG. 3.

A computer system 50, having an appearance, as shown in FIG. 3, comprises a main frame 51 incorporating thereinto a CPU, a memory unit, etc., an image display unit 52 for displaying images on a display screen 52a, a keyboard 53 serving as a handler for inputting various types of instructions to the computer system 50, and a mouse 54 serving as a handler for indicating a position on the display screen 52a of the image display unit 52. The main frame 51 is provided with an MO mounting aperture 51a adapted to detachably mount an MO (magneto-optical disc) 100.

The computer system 50, having an internal structure, as shown in FIG. 4, comprises: a CPU 55 on which various programs are run; a memory 56 which is used as a temporal storage area for the program to be run and data; a keyboard interface 57 between which and the keyboard 53 data are transferred; a mouse interface 58 for transmitting data according to an operation of the mouse 54; a display interface 59 for transmitting data for a display to the image display unit 52; an MO drive 60 for driving the MO 100 mounted through the MO mounting aperture 51a shown in FIG. 3; and a hard-disk drive 61 for driving an internal hard-disk 62. Those units are connected to one another through a bus 63 as shown in FIG. 4.

Here, there will be explained a case where in the computer system 50 shown in FIGS. 3 and 4, the right to use contents stored in the MO 100 is devolved to the hard-disk 62. In case of a simple transfer of the right of using, or in the event that the available number of times has been set up, regarding a case where a part of the available number of times is first devolved, it has been already explained with reference to FIGS. 1 and 2. Thus, hereinafter, there will be explained a case where the available number of times, which was first devolved, is used up, and then a predetermined available number of times is again devolved. While the conceptual explanation has been made with reference to FIGS. 1 and 2 for the purpose of the better understanding of the present invention, the more detailed explanation will be made hereinafter.

Figure 5:
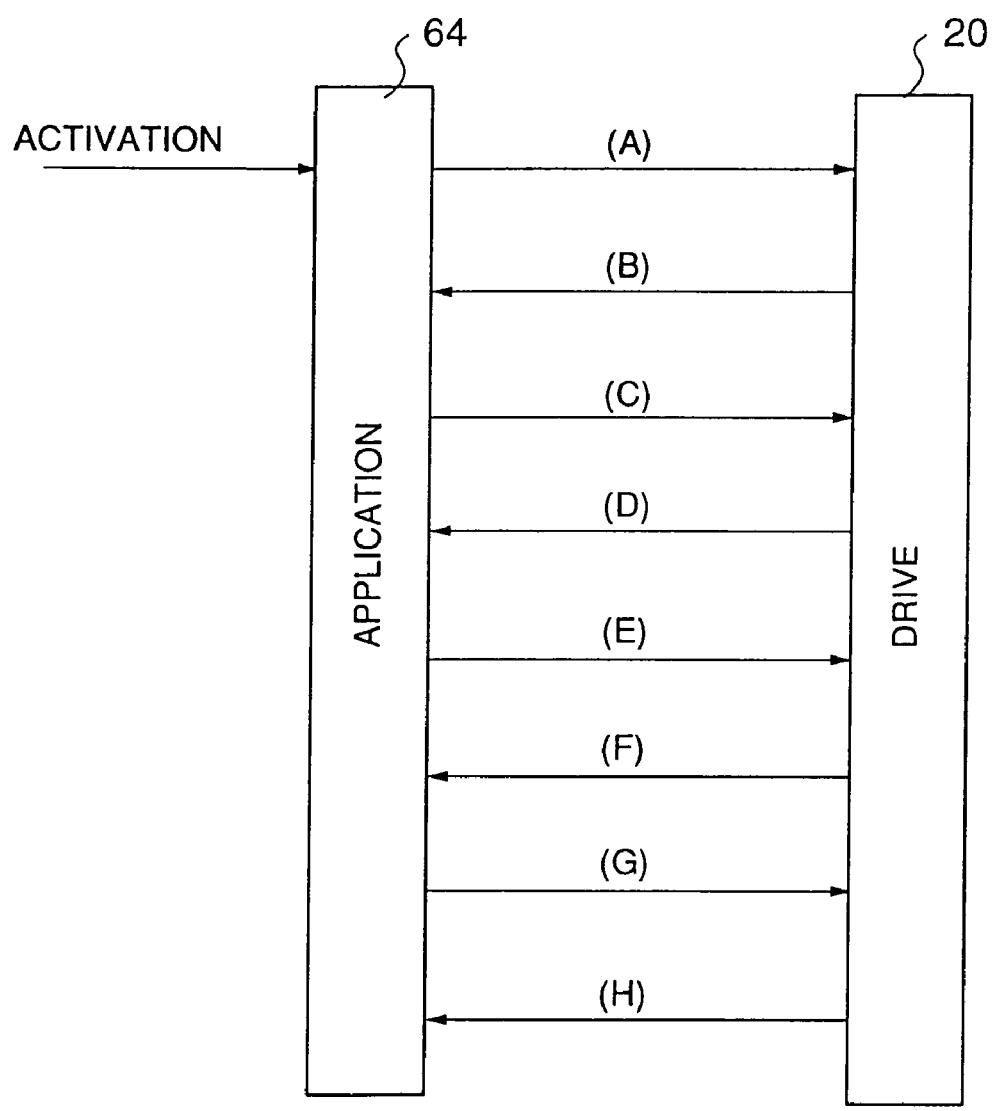
FIG. 5 is a view useful for understanding the procedure of devolving the right to use contents stored in an MO to a hard disk.

FIG. 5 is a view useful for understanding the procedure of devolving the right to use contents stored in the MO 100 to the hard disk 62.

In FIG. 5, there is shown an application 64 and a drive 20. The application 64 is a program to be run on the CPU 55, which program is directly operable by an operator of the computer system 50. Here, this program instructs to devolve the right to use contents stored in the MO 100 to the hard-disk 62. The drive 20 is here a composite unit of the MO drive 60 and the hard-disk drive 61 shown in FIG. 4. While there will be explained hereinafter the procedure of devolving the right to use contents stored in the MO 100 to the hard disk 62, it is assumed that 10 times in the available number of times for contents to be devolved remains in the MO 100, and of which 3 times is devolved to the hard-disk 62.

For the purpose of simplification of the explanation, it is assumed that only one contents which can be devolved exists, and when it is addressed as contents, it means contents to be devolved (or contents which the right to use is transferred to the hard-disk 62 through the devolution).

(1) First, the application 64 instructs the drive 20 that a devolving source of contents is the MO 100 and a devolving destination of contents is the hard-disk 62 (part (A) in FIG. 5).

(2) Then, the drive 20 makes preparations for accessing the MO 100 and the hard-disk 62. When they are ready to be accessed, the drive 20 informs the application 64 that they are ready to be accessed (part (B) in FIG. 5).

(3) Then, the application 64 transmits to the drive 20 (both the MO drive 60 and the hard-disk drive 61) a password to conceal information to be transmitted from the drive 20 to the application 64, and issues to the drive 20 a command to read the use information stored in the secure area (cf. FIGS. 1 and 2) of the MO 100 (part (C) in FIG. 5). Here, as mentioned above, it is assumed that the MO 100 stores the use information '10' indicative of 10 times in the available number of times.

(4) Then, on the MO drive 60 (cf. FIG. 4) constituting the drive 20, the following processing is performed. It is noted that the MO drive 60 is also loaded with a CPU and in addition a microprogram for accessing the mounted MO 100, wherein the firmware comprising the combination of the hardware and software of the MO drive 60 executes the processing in the MO drive 60.

(4-1) Read the media ID of the MO 100 from the MID area (cf. the MID area 11 in FIGS. 1 and 2) of the MO 100.

(4-2) Read use information encrypted with the media ID from the secure area (cf. the secure area 12 in FIGS. 1 and 2) of the MO 100.

(4-3) Decode the use information thus read with the media ID.

(4-4) Encode the decoded use information with the password transmitted from the application 64 in the above-mentioned step (3).

(4-5) Transmit the information thus encoded to the application 64 (part (D) in FIG. 5).

(5) Then, the application 64 executes the following processing.

(5-1) Decode the use information transmitted from the MO drive 60 with the password.

(5-2) Confirm that the available number of times represented by the decoded use information is not '0' indicative of the available number of times being zero or nothing. It is noted that according to the present embodiment, as a premise of the explanation, '10' indicative of 10 times in the available number of times is set up, and thus it is not '0'.

(5-3) Next, the application 64 generates to the drive 20 a command to read the use information as to the hard-disk 62 or the devolving destination for the right of using. Incidentally, as mentioned above, according to the present embodiment, as a premise of the explanation, it is presumed that the hard-disk 62 was previously set up with the available use for contents in any number of times, and the available number of times becomes '0'.

(6) Then, the hard-disk drive 61 executes the following processing. It is noted that the hard-disk drive 61 is also loaded with a CPU and in addition a microprogram, wherein the firmware comprising the combination of the hardware and software of the hard-disk drive 61 executes the processing in the hard-disk drive 61 in a similar fashion to that of the processing in the MO drive 60.

(6-1) Read the media ID of the hard-disk 62 from the MID area (cf. the MID area 31 in FIGS. 1 and 2) of the hard-disk 62.

(6-2) Read use information encrypted with the media ID from the secure area (cf. the secure area 32 in FIGS. 1 and 2) of the hard-disk 62.

(6-3) Decode the use information thus read with the media ID of the hard-disk 62.

(6-4) Encode the decoded use information with the password transmitted from the application 64 in the above-mentioned step (3).

(6-5) Transmit the information thus encoded to the application 64 (part (F) in FIG. 5).

(7) Then, the application 64 executes the following processing.

(7-1) Decode the use information transmitted from the hard-disk drive 61 with the password.

(7-2) Confirm that the available number of times represented by the decoded use information is '0'.

When the available number of times is not '0', and it is still available, according to the present embodiment, it is displayed on the display screen 52a (cf. FIG. 3) that it is still available, so that this message is informed to an operator. At this stage, the processing is interrupted.

Here, as a premise of the explanation, the available number of times is '0', and in this case, the process goes to the following step.

(7-3) Information (referred to as information as to the new number of times) representative of the available number of times (for example, 3 times based on a premise of the explanation) which is set up newly on the hard-disk 62 is encoded with the password and transmitted to the drive 20 (both the MO drive 60 and the hard-disk drive 61) (part (G) in FIG. 5).

(8) Upon receipt of the information as to the new number of times, the MO drive 60 executes the following processing.

(8-1) Read the media ID of the MO 100.

(8-2) Read use information encrypted with the media ID stored in the secure area of the MO 100.

(8-3) Decode the use information thus read with the media ID of the MO 100 and derive the available number of times '10'.

(8-4) Decode information as to the new number of times encoded with the password, which is transmitted from the application 64, with the password transmitted in the step (3) and derive the available number of times '3'.

(8-5) Subtract the available number of times '3' to be transferred to the hard-disk 62 from the available number of times '10' stored in the MO 100 and obtain the new available number of times '7'.

(8-6) Encrypt the new use information representative of the new available number of times '7' with the media ID of the MO 100.

(8-7) Replace the use information representative of the available number of times '10' stored in the MO 100 by the encrypted new use information in accordance with an overwriting scheme, so that the available number of times '7' is set up on the MO 100.

(9) On the other hand, upon receipt of the information as to the new number of times transmitted in the above step (7-3), the hard-disk drive 61 executes the following processing.

(9-1) Read the media ID of the hard-disk 62.

(9-2) Decode information as to the new number of times encoded with the password, which is transmitted from the application 64, with the password transmitted in the step (3) and derive the available number of times '3'.

(9-3) Encrypt the new use information representative of the new available number of times '3' with the media ID of the hard-disk 62.

(9-4) Replace the use information representative of the available number of times '0' stored in the hard-disk 62 by the encrypted new use information in accordance with an overwriting scheme, so that the available number of times '3' is set up on the hard-disk 62.

(10) The drive 20 informs to the application 64 that the processing for the use devolution has been completed.

In this manner, a devolution of the right to use contents (here a part of the right of using) is implemented.

While the above explanation referred to FIG. 5 does not mention as to the matter of a transfer of contents itself and the key for decoding the encrypted contents from the MO 100 to the hard-disk 62, as mentioned above, here there is explained a case of re-setting of the available number of times for contents. Consequently, it stands on the premise that contents itself and the key for decoding the contents are already transferred to the hard-disk 62 at the time of the first devolution. Contents itself are transferred (copied) from the MO 100 to the hard-disk 62 in the form of encryption at the time of the first devolution. Further, the above explanation stands on the premise that the key is encrypted on the respective media IDs independent of the use information and stored in the respective secure areas.

Incidentally, according to the present embodiment referred to FIG. 5, as mentioned above, a processing for devolution of the right to use contents is proceeded with while a various communication is performed between the application 64 and the drive 20. However, it is acceptable to provide, instead of such processing for devolution of the right to use contents, an arrangement that the application 64 designates contents of which the right of using is intended to be devolved, a devolution source of the right to use the contents (here the MO 100), a devolution destination (here the hard-disk 62) and the number of times of the use to be devolved, and thereafter the application 64 leaves the processing to the drive 20 (here both the MO drive 60 and the hard-disk drive 61), so that the drive 20 executes the above-mentioned devolution processing independent of the application 64, and at the stage of completion of the devolution processing, and only in the event that the devolution processing is not carried out properly by any inconvenience (for example, in the event that the MO 100 is entitled to only the available number of times less than the designated available number of times regarding devolution, or in the event that the hard-disk 62 is still the available number of times regarding devolution, that is, the available number of times regarding devolution is not yet '0' on the hard-disk 62), the drive 20 informs of it to the application 64.

According to the above-mentioned explanation, the above-mentioned devolution processing is shared between the MO drive 60 and the hard-disk drive 61 into execution. However, it is acceptable that one of the MO drive 60 and the hard-disk drive 61 is used for an access only, and another is used for the above-mentioned devolution processing.

Figure 6:
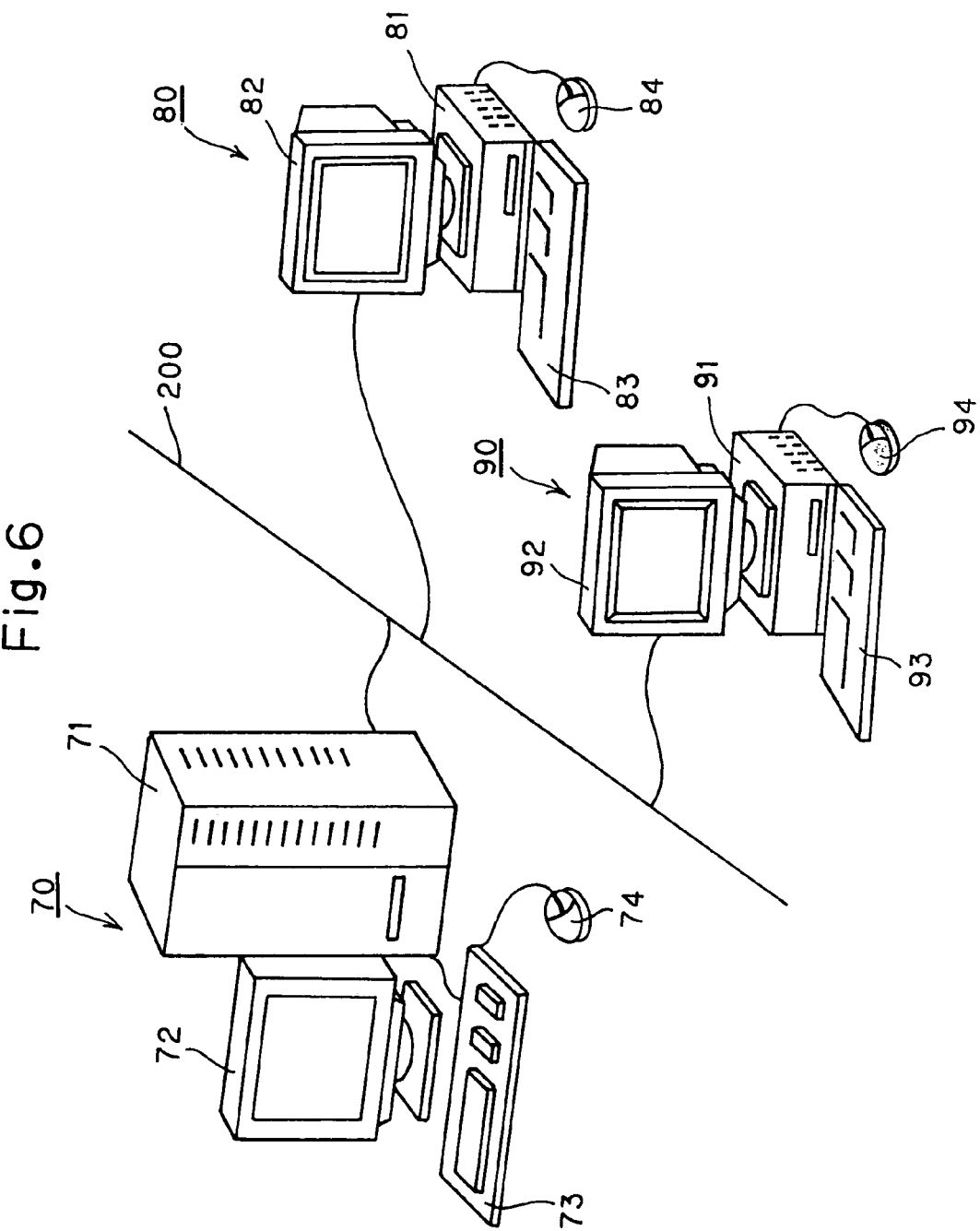
FIG. 6 is a typical illustration of a computer network into which a license devolution apparatus according to an embodiment of the present invention is incorporated.
Figure 7:
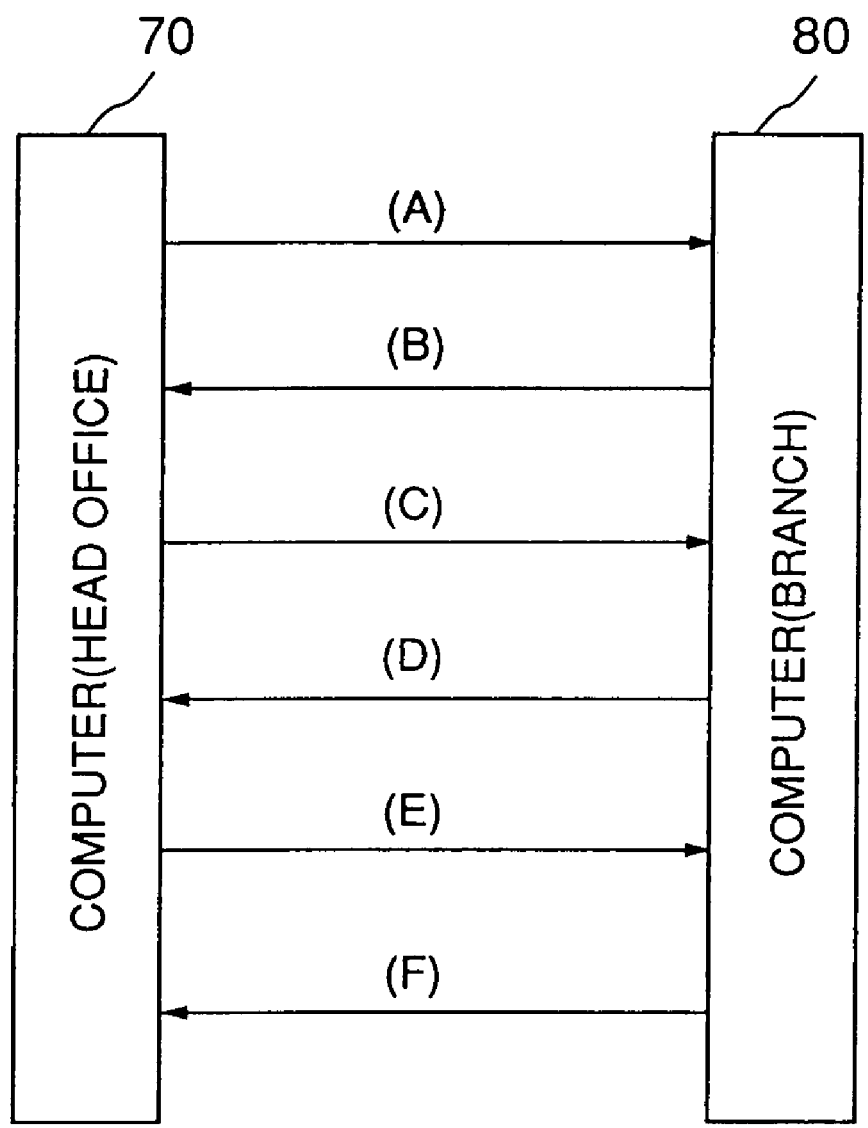
FIG. 7 is a view useful for understanding the procedure of devolving the right to use contents from a computer system, which constitutes the computer network shown in FIG. 6, to another computer system.

FIG. 6 is a typical illustration of a computer network into which a license devolution apparatus according to an embodiment of the present invention is incorporated; and FIG. 7 is a view useful for understanding the procedure of devolving the right to use contents from a computer system, which constitutes the computer network shown in FIG. 6, to another computer system.

In FIG. 6, there is shown a computer system 70 for contents management and two computer systems 80 and 90 which are for using contents. Those three computer systems 70, 80 and 90 are connected via a communication line 200 to one another.

Each of those computer systems 70, 80 and 90 has a similar structure to that of the computer systems 50 shown in FIG. 3. That is, the computer systems 70, 80 and 90 comprise: main frames 71, 81 and 91; image display units 72, 82 and 92; keyboards 73, 83 and 93; and mouses 74, 84 and 94. Each of the computer systems 70, 80 and 90 has a similar internal structure to that shown in FIG. 4. Redundant explanation will be omitted.

It is assumed that the computer system 70 for contents management is set up at the head office of a certain company, and the computer systems 80 and 90, which are for using contents, are set up at branch offices of that company, respectively. Hereinafter, for the purpose of simplification, the computer systems 70, 80 and 90, which are set up at the head office and the branch offices, respectively, are referred to as head office 70 and branch offices 80 and 90, respectively.

It is assumed that the head office 70 buys whole branches of license for various types of contents, and distributes the license to the branch offices and manages the whole branches of license. That is, even if the same contents is concerned with, the head office buys the necessary number of rights to use the contents, and distributes the rights of using to the branches who need the contents. What is meant by the necessary number of rights to use the same contents is the number of rights to use the same contents, which is to be bought in accordance with the necessity, as if a plurality of the same books (e.g. three books) are bought, but not the number of times to use the contents. The head office manages on each contents the remaining number of rights of using, which is obtained through subtracting the number of rights of using distributed to the branches from the bought number of rights of using. On the other hand, a plurality of rights of using on the same contents is not necessary for the branches, and thus each of the branches manages only as to whether one's own self is entitled to the right of using on the associated contents. The head office and the respective branches manage use information as to a lot of contents. A list of use information as to a lot of numbers of contents is referred to as "permission information".

It is assumed that the rights of using as to various types of contents are already devolved from the head office 70 to the branches 80 and 90, and further the right of using as to a certain contents is devolved from the head office 70 to a certain branch (here the branch 80). It is noted that contents as to which the right of using is intended to be newly devolved is referred to as a 'new contents'. There will be explained a case where the right of using as to the new contents is devolved to the branch 80. Here it is assumed that the right of using as to the new contents is devolved from the hard-disk of the head office 70 to the hard-disk of the branch 80.

(1) First, it is informed from the head office 70 to the branch 80 that the right of using as to the new contents is devolved to the branch 80 (part (A) in FIG. 7).

(2) Upon receipt of such information, the branch 80 sets the hard-disk of the branch 80 to a ready state, and when the preparations for access is completed, the branch 80 informs the head office 70 that access is ready (part (B) in FIG. 7).

(3) Then, the head office 70 transmits to the branch 80 a password to conceal information transmitted from the branch 80, and issues to the branch 80 a command to forward the permission information (a list of use information as to a plurality of types of contents) stored in the secure area of the hard-disk of the branch 80 (part (C) in FIG. 7).

(4) Upon receipt of such command, the branch 80 executes the following processing.

(4-1) Read the media ID of the hard-disk of the branch 80.

(4-2) Read permission information encrypted with the media ID of the hard-disk of the branch 80 from the secure area of the hard-disk of the branch 80.

(4-3) Decode the permission information thus read with the media ID.

(4-4) Encode the decoded permission information and the media ID of the hard-disk of the branch 80 with the password transmitted from the head office 70 in the above-mentioned step (3).

(4-5) Transmit the information thus encoded and the media ID to the head office 70 (part (D) in FIG. 7).

(5) Then, the head office 70 executes the following processing.

(5-1) Decode the permission information and the media ID transmitted from the branch 80 with the password.

(5-2) From the decoded permission information, confirm that the branch 80 is not entitled to the right of using as to the new contents which is intended to be transferred to the branch 80. The reason why this is to do so is that it is avoided that the right of using as to the same contents is redundantly set up on the same branch.

(5-3) Read the media ID of the hard-disk of the branch 80.

(5-4) From the secure area of the hard-disk of the head office 70, read the permission information encrypted by the media ID of the hard-disk of the head office 70, and the key for decoding the contents as to which the right of using is intended to be permitted, the key being also encrypted by the same media ID.

(5-5) Decode the permission information and the key thus read with the media ID read.

(5-6) Referring to the decoded permission information, confirm that the head office 70 has still the remainder of the right of using as to the contents (new contents), which right of using is intended to be newly devolved to the branch 80.

When the head office 70 has no remainder of the right of using as to the new contents, the head office 70 informs the branch 80 that the head office 70 cannot give a permission as to using of the new contents. However, here, it is assumed that the head office 70 has still the remainder of the right of using as to the new contents.

(5-7) Rewrite information representative of the right of using as to the new contents, of the permission information on the branch 80, which is decoded in the step (5-1), from 'entitled no use' to 'entitled to use'.

(5-8) Encode both the rewritten permission information and key with the password.

(5-9) Read the encrypted new contents from the user area of the hard-disk of the head office 70.

(5-10) Transmit the encoded permission information and key, and the encrypted new contents to the branch 80 (part (E) in FIG. 7).

(5-11) In the head office 70, subtract by 1 information related to the number of rights of using as to the new contents as to which the right of using is permitted to the branch 80, of the permission information on the head office 70, which is decoded in the step (5-5), and thereby renewing the information to a new permission information.

(5-12) Encrypt the new permission information thus renewed with the media ID of the hard-disk of the head office 70.

(5-13) Replace the permission information before the renewal, which is stored in the secure area of the hard-disk of the head office 70, by the new permission information thus encrypted.

(6) In the branch 80, upon receipt of the encoded permission information and key, and the encrypted new contents, which are transmitted in step (5-10), the branch 80 executes the following processing.

(6-1) Store the received new contents in the user area of the hard-disk of one's own self (branch 80) in the form of encryption.

(6-2) Decode the received permission information and key with the password transmitted in step (3).

(6-3) Read the media ID of the hard-disk of one's own self (branch 80).

(6-4) Encrypt the permission information and key decoded with the password with the media ID thus read.

(6-5) Replace the permission information, which is stored in the secure area of the hard-disk of one's own self (branch 80), by the encrypted permission information and key.

In this manner, the right of using as to the new contents is devolved from the head office 70 to the branch 80.

As will be understood from the above-mentioned embodiments, it is possible to implement a license devolution apparatus according to the present invention in a system comprising a single computer and the like, or alternatively in a network in which a plurality of computers and the like are connected to one another.

As explained above, according to the present invention, it is possible to copy or distribute contents while contributing to a protection of the copyright for the contents.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A license devolution apparatus, comprising:
   storage medium accessing means for accessing a first storage medium storing contents encrypted with a predetermined key, storing a first media ID identifying the first storage medium, and storing a first encryption secure information generated by encrypting the key and a first license information that represents a right to use the contents, together with one another or individually, with the first media ID, and accessing a second storage medium storing a second media ID identifying the second storage medium;
   decoding means for decoding the first encryption secure information stored in said first storage medium by reading the first media ID and using the first media ID to obtain the key and the first license information; and
   encryption means for reading the second media ID and encrypting the key and a second license information that represents a second right to use the contents devolved from the first license information stored on the first storage medium by passing down the first license information of the first storage medium to the second storage medium as a successor of the first storage medium and degenerating the first license information in the first storage medium, together with one another or individually, with the read second media ID, to generate a second encryption secure information with the second media ID for storage in said second storage medium.

2. A license devolution apparatus according to claim 1, wherein said encryption means degenerates the first license information by encrypting with the first media ID a third license information, obtained through subtracting the second license information from the first license information, or encrypts with the first media ID both the key and a third right of using, to generate a third encryption secure information and stores the third encryption secure information in the first storage medium.

3. A license devolution apparatus according to claim 1, wherein if the entire rights of using the contents, to which the first storage medium is entitled, are devolved to the second storage medium, the first encryption secure information stored in the first storage medium is destroyed.

4. A license devolution apparatus according to claim 1, wherein before devolution of the right to use contents, the first storage medium stores contents whose right to use is intended to be devolved as encrypted contents, and
   wherein said license devolution apparatus further comprises contents transfer means for reading the encrypted contents from the first storage medium, and storing in the second storage medium the read encrypted contents.

5. A license devolution apparatus according to claim 2, wherein the first license information and the second license information represent the presence of the right to use, and the third license information represents the absence of the right to use.

6. A license devolution apparatus according to claim 2, wherein the first license information represents a first available number of times or available time, the second license information represents a second available number of times or available time which is less than the first available number of times or available time, and the third license information represents a third available number of times or available time which is obtained through subtracting the second available number of times or available time from the first available number of times or available time.

7. A license devolution apparatus according to claim 1, wherein the first and second storage media form a composite storage unit, the composite storage unit further comprising a first drive and a second drive driving the first storage medium and the second storage medium, respectively, said first drive and said second drive having a first firmware and second firmware accessing the first storage medium and the second storage medium, respectively,
   wherein said decoding means and said encryption means are arranged as a composite unit firmware including said first firmware and said second firmware; and
   wherein only said first firmware has authority to access the first storage medium driven by said first drive, and only said second firmware has authority to access the second storage medium driven by said second drive.

8. A license devolution method, comprising:
   storing in a first storage medium contents encrypted with a predetermined key, a first media ID identifying the first storage medium, and encryption secure information generated by encrypting with the first media ID, the key and a first license information, which represents a right to use the contents;
   decoding the first encryption secure information by reading the first media ID and using the first media ID to obtain the key and the first license information;

generating a second encryption secure information by reading a second media ID identifying a second storage medium and encrypting with the read second media ID, the key and a second license information, which represents a second right to use the contents that is devolved from the first license information stored on the first storage medium by passing down the first license information of the first storage medium to the second storage medium as a successor of the first storage medium and degenerating the first license information in the first storage medium; and storing the second encryption secure information in said second storage medium, wherein the right to use the contents stored in the first storage medium is devolved from the first storage medium to the second storage medium.

9. A license devolution system in communication with computer readable storages, comprising:

an access unit accessing a first storage unit having a first storage ID and storing contents encrypted with a predetermined key, and storing a first encryption secure information generated by encrypting the key and a first license information that represents a right to use the contents, with the first storage ID, and accessing a second storage unit having a second storage ID identifying the second storage unit;

a decoder decoding the first encryption secure information stored in said first storage unit by reading the first storage ID and using the first storage ID to obtain the key and the first license information;

a devolving unit devolving the right to use the contents of the first storage unit to the second storage unit by generating a second license information that represents a second right to use the contents devolved from the first license information stored on the first storage unit by passing down the first license information of the first storage medium to the second storage medium as a successor of the first storage medium and degenerating the first license information in the first storage medium; and an encryption unit reading the second storage ID, and encrypting the key and the second use information with the read second storage ID to generate a second encryption secure information stored in said second storage unit.

10. A license devolution computer, comprising:

a composite storage unit comprising a first storage unit, a second storage unit, and a composite storage access unit accessing the first storage unit having a first storage ID and storing contents encrypted with a predetermined key and storing a first encryption secure information generated by encrypting the key and a first license information, which represents a right to use the contents, with the first storage ID, and accessing the second storage unit having a second storage ID identifying the second storage unit, the composite storage access unit comprising:

a decoder decoding the first encryption secure information stored in said first storage unit by reading the first storage ID and using the first storage ID to obtain the key and the first license information; and a devolving unit reading the second storage ID and devolving the right to use the contents of the first storage unit to the second storage unit by generating a second license information, which represents a second right to use the contents devolved from the first license information stored on the first storage unit by passing down the first license information of the first storage medium to the second storage medium as a successor of the first storage medium and reducing the first license information in the first storage medium according to the passing down, and encrypting the key and the second use information with the second storage ID to generate a second encryption secure information stored in said second storage unit.

* * * * *

UNITED STATES PATENT AND TRADEMARK OFFICE
CERTIFICATE OF CORRECTION

PATENT NO. : 6,999,947 B2 Page 1 of 1
DATED : February 14, 2006
INVENTOR(S) : Kenichi Utsumi et al.

It is certified that error appears in the above-identified patent and that said Letters Patent is hereby corrected as shown below:

<u>Title page,</u>
Item [56], References Cited, FOREIGN PATENT DOCUMENTS,
change "GB     0613073 B1     8/1994" to -- EP          0613073 B1     8/1994 --.

Signed and Sealed this

Thirtieth Day of May, 2006

JON W. DUDAS
*Director of the United States Patent and Trademark Office*